United States Patent [19]

McMickle et al.

[11] 4,441,453

[45] Apr. 10, 1984

[54] ARTIFICIAL FISH HABITAT

[75] Inventors: Robert L. McMickle; Danny R. Foote, both of Spirit Lake, Iowa

[73] Assignee: Berkley and Company, Inc., Spirit Lake, Iowa

[21] Appl. No.: 347,523

[22] Filed: Feb. 10, 1982

[51] Int. Cl.³ .............................................. A01K 61/00
[52] U.S. Cl. ......................................................... 119/3
[58] Field of Search ........................................ 119/3, 5

[56] References Cited

U.S. PATENT DOCUMENTS

| | | | |
|---|---|---|---|
| 3,083,686 | 4/1963 | Thorsell et al. | 119/5 |
| 3,118,424 | 1/1964 | Willinger | 119/3 |
| 3,452,966 | 7/1969 | Smolski | 261/77 |
| 3,464,385 | 9/1969 | Pellett, Sr. | 119/3 |
| 3,540,415 | 11/1970 | Bromley | 119/3 |
| 3,763,997 | 10/1973 | Willinger et al. | 119/5 |
| 3,933,124 | 1/1976 | LeDoux et al. | 119/2 |

Primary Examiner—Hugh R. Chamblee
Attorney, Agent, or Firm—Kinney, Lange, Braddock, Westman & Fairbairn

[57] ABSTRACT

An artificial fish habitat consisting of individual strands of a buoyant, water impervious material, such as foamed polyethylene or polypropylene, secured to a zinc anchor weight for installation on the bed of a body of water.

7 Claims, 2 Drawing Figures

U.S. Patent   Apr. 10, 1984   4,441,453
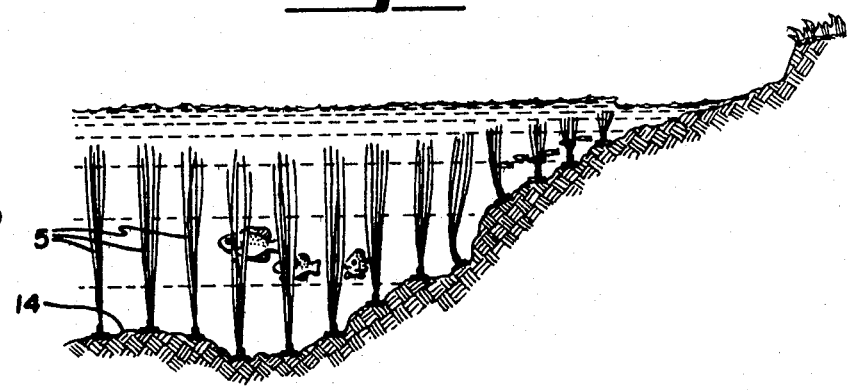
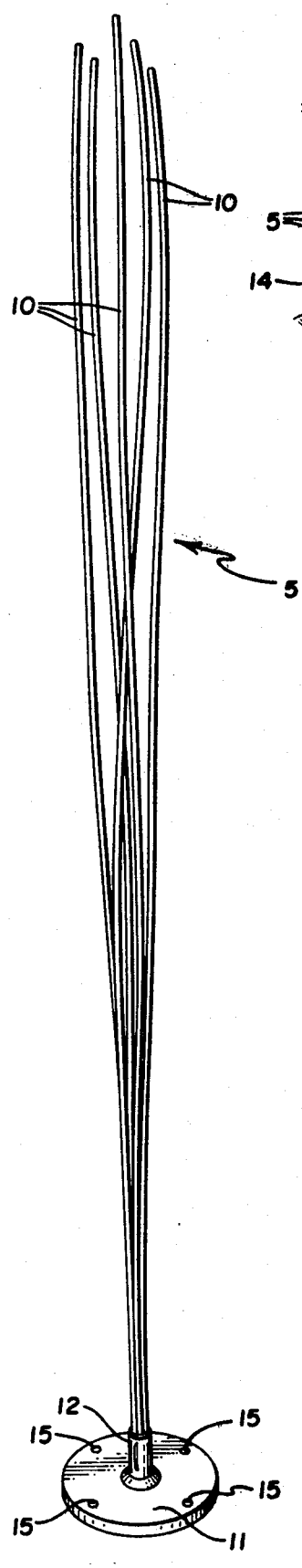

ARTIFICIAL FISH HABITAT

DESCRIPTION

Background of the Prior Art

Fish, whether live bearers or egg layers, need a protected area in which to spawn. Adult fish are often cannibalistic and will devour their own young and eggs laid by themselves or other fish. Some protective habitat must be provided in an aquatic environment to increase or maintain the fish population.

Presently, conservation officers employ wooden or concrete structures to provide shelter for fish in fresh water lakes having no bottom vegetation. These structures are expensive and may present hazards to water enthusiasts.

Concrete blocks, field stones or old automobile bodies have also been utilized as artificial reefs in salt water bodies.

Helicoidal thermoplastic structures heavier than water have been described as providing another habitat when deposited on the bed of a body of water as discussed in Ledoux U.S. Pat. No. 3,993,124.

Willinger, in U.S. Pat. No. 3,118,424, relates to a spawning device consisting of strands secured to a holding means and floatation means.

A synthetic reef with flexible base material and elongated fronds is shown in Bromley U.S. Pat. No. 3,540,415. In that patent, the reef which is laid as a large connected mesh bed will not conform well to uneven lake bed topography. A further disadvantage is that the bed may lift and move about due to tidal and wave action, and the strands and bed may even be pulled out by anchors fouling in the base material. The anchor means for the synthetic reef comprises a plurality of weights which are dropped onto the submerged bed.

Other prior art habitats either lay unmoving as debris on the water bed or floor of the body or float on the surface, subject to degradation and damage through drift and winter freezing.

BRIEF SUMMARY OF THE INVENTION

An artificial habitat for fish is provided, including individual strands of floatable material joined to a relatively heavy anchor weight. The strands float toward the surface like common seaweed and are held to the bottom of the lake by the anchor weights. The strand length may be varied depending on the depth of water and the type of fish habitat desired.

The fish habitat is placed in use in a simple and inexpensive manner merely by dropping the individual strands and anchors where desired or by connecting the anchors together to lay strips or grids.

Provision of a fish habitat using the present invention is cheaper than utilizing prior art concrete and wooden structures because no assembly is required, and a habitat according to the present invention may be installed quickly without elaborate equipment. Any geometrical configuration may be provided on the lake bed when the habitat is laid singly. A further advantage is that the invention is useful on any bottom topography since the individual units each rest where they fall and are not influenced by waves or currents, as is the case with mesh fabric bed systems. The individual nature of the habitat elements also prevents boat anchors from fouling with a mesh bed of the type discussed in U.S. Pat. No. 3,540,415 and the resultant pulling of the entire assembly free from its desired location.

The inherent safety of the present habitat to water enthusiasts is an inherent aspect of the invention because no rigid, unyielding structures are present for water skiers or boats to hit. The individual habitat elements can be stored relatively compactly and can be moved easily once in place, if desired.

BRIEF DESCRIPTION OF THE DRAWINGS

A detailed description of one preferred embodiment of the invention is hereafter described, with specific references being made to the drawings in which:

FIG. 1 illustrates a typical fish habitat element according to the invention; and FIG. 2 is an elevation view of a lake bed depicting a plurality of habitat elements in place.

DETAILED DESCRIPTION OF THE DRAWINGS

FIG. 1 shows a habitat element 5. Strands 10 of a low density material, such as polyethylene, nylon, polypropylene, vinyl, urethane or polytetrafluoroethylene are formed with a diameter of about 0.030–0.250 inches. Polyolefins, particularly polyethylene and polypropylene, are preferred materials due to their inherent floatability and water imperviousness. The strands 10 may be solid round, oval, flat or slit films when the material chosen provides the desired density needed for floatation. Higher density materials, such as polytetrafluoroethylene, may be utilized to form hollow round or hollow oval strands 10. The buoyancy of the hollow strands 10 is provided by entrapped air. The length may vary from a few inches for shallow water applications to 30 feet or more if it is desired to create a habitat in deep lakes. The only length limitation is on the planned usage depth and that the strands 10 should remain below the ice level in lakes subject to freezing.

The density range of the strands 10 is from 0.4–0.97 g/cm$^3$. A lower density than water is needed to provide floatation. The strands 10 must also be lighter than water to compensate for the extra weight that algae accumulations impart with time. To achieve the desired density range, some of the materials would need to be blown or foamed. Strands 10 formed by extrusion with a blowing agent, such as Chempore 125 manufactured by the Polychemical Department of Stepan Chemical Co., Wilmington, Mass., polypropylene and colorant have been found to be acceptable in density and water impermeability.

Unblown tubular strands 10 may be formed of higher density materials with the desired density provided by sealing the tubes shut at various intervals to provide air bubble floatation.

The strands 10 are then secured to an anchor means 11, either singly or, as shown in FIG. 2, in clusters of up to several hundred to form a habitat. Seven to eight strands 10 in a cluster secured to the anchor weight 11 are preferred.

The anchor means 11 may be formed of zinc or a similar material to form a weight which resists corrosion. Alternatively, the anchor means 11 may be formed from plastic coated weights of sand, metal or any suitable material having a density sufficient to overcome the buoyancy of the strands 10. Preferably, the zinc anchor means 11 would be die cast with a flat bottom to rest on the lake bed 14. Holes 15 may be formed at the outer edges of the anchor means 11 to serve as linkage means to weave individual artificial fish habitats into a grid or pattern.

The strands 10 may be joined to the anchor means 11 in any suitable manner, such as with glue, wedging, crimping and melting the plastic strands 10.

A shoulder means 12 may be provided in the anchor means 11 to provide an attachment point for the strands 10. The shoulder means 12 may be of suitable thickness to allow crimping as the joining means.

EXAMPLE

Strands 10 were prepared using twenty-five pounds of polypropylene resin, sixty grams of Chempore 125 blowing agent and one-third cup of concentrated colorant. The materials were run through an extruder at 375° F. at 114 rpm in a circumferentially arranged twenty-hole die. The resultant strands 10 were about 0.072–0.075 inches in diameter with a density of 0.445 g/cm$^3$. Age and moisture in the blowing agent raises the resultant density obtained.

In considering this invention, it should be remembered that the present disclosure is illustrative only, and the scope of the invention should be determined by the appended claims.

What is claimed is:

1. An artificial fish habitat located in a natural body of water, such as a lake, having a bottom which is irregular so that the body of water is of variable depth, said habitat comprising:
   a plurality of separate self-weighted non-corrosive anchor members dropped in the body of water at spaced points;
   a plurality of buoyant water impervious strands for each of the anchor members, said strands having a density of from 0.4 to 0.97 gms/cm$^3$ and having a length of between a few inches and 30 feet or more depending upon the depth of the body of water in which they are to be placed;
   means for connecting said strands to the associated anchor member; and
   each anchor member having sufficient mass to remain on the bottom at the area at which it has been dropped despite the buoyancy of the strands and regardless of the depth of the water at which it is placed.

2. The fish habitat of claim 1 wherein each anchor member is a flat-bottomed die cast disc of zinc.

3. The fish habitat of claim 1 wherein each of said anchor members has an aperture therethrough for connecting said anchor member to another anchor member.

4. The fish habitat of claim 1 wherein said strands are formed from foamed polyolefins.

5. The strands of claim 4 wherein said foamed polyolefin is polypropylene or polyethylene.

6. The fish habitat of claim 1 wherein said strands are formed of a blown material from the group consisting of polyethylene, polypropylene, nylon, urethane or vinyl.

7. The fish habitat of claim 1 wherein said strands are hollow filaments of polytetrafluoroethylene.

* * * * *